(12) United States Patent
Chang et al.

(10) Patent No.: US 9,367,329 B2
(45) Date of Patent: Jun. 14, 2016

(54) INITIALIZATION OF MULTI-CORE PROCESSING SYSTEM

(75) Inventors: Steven S. Chang, San Jose, CA (US); Anshuman Thakur, Beaverton, OR (US); Ramacharan Charan Sundararaman, Hillsboro, OR (US); Ramon Matas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/993,573

(22) PCT Filed: Dec. 29, 2011

(86) PCT No.: PCT/US2011/067900
§ 371 (c)(1),
(2), (4) Date: Jun. 12, 2013

(87) PCT Pub. No.: WO2013/101093
PCT Pub. Date: Jul. 4, 2013

(65) Prior Publication Data
US 2014/0006763 A1    Jan. 2, 2014

(51) Int. Cl.
*G06F 9/24* (2006.01)
*G06F 15/177* (2006.01)
*G06F 9/44* (2006.01)
(Continued)

(52) U.S. Cl.
CPC ............ *G06F 9/4405* (2013.01); *G06F 9/4403* (2013.01); *G06F 15/177* (2013.01); *G06F 1/24* (2013.01); *G06F 11/0724* (2013.01); *G06F 12/0813* (2013.01); *G06F 13/00* (2013.01); *G06F 13/14* (2013.01); *G06F 15/80* (2013.01)

(58) Field of Classification Search
CPC ..... G06F 1/24; G06F 9/4405; G06F 11/0724; G06F 12/0813; G06F 13/14; G06F 15/80; H04L 12/437
USPC .................................................. 713/1, 2, 100
See application file for complete search history.

(56) References Cited

U.S. PATENT DOCUMENTS

2003/0233492 A1    12/2003  Schelling
2008/0168255 A1     7/2008  Abou-Emara et al.
(Continued)

OTHER PUBLICATIONS

Notification of Transmittal of the International Search Report and the Written Opinion or the International Searching Authority, or the Declaration for PCT Counterpart Application No. PCT/US2011/067900, 10 pgs., (Sep. 5, 2012).
(Continued)

*Primary Examiner* — Michael J Brown
(74) *Attorney, Agent, or Firm* — Nicholson De Vos Webster & Elliott LLP (57) ABSTRACT

This disclosure is directed to use of shared initialization and configuration vectors, which are delivered to processing cores in a multi-core processor using packets. An initialization core may include reset logic that may read initialization and configuration vectors from a centralized storage location, which may be on a die containing the processing cores (e.g., a fuse, etc.), off the die (e.g., in volatile memory, flash memory, etc.), or a combination of both. The initialization core may then generate packets to transmit the initialization and configuration vectors to processing cores that await initialization (e.g., following a reset). In some instances, the initialization and configuration vector information may be shared by two or more cores of a same type.

18 Claims, 9 Drawing Sheets

(51) Int. Cl.
  *G06F 1/24* (2006.01)
  *G06F 11/07* (2006.01)
  *G06F 13/14* (2006.01)
  *G06F 15/80* (2006.01)
  *G06F 12/08* (2016.01)
  *G06F 13/00* (2006.01)

(56) References Cited

U.S. PATENT DOCUMENTS

2009/0168767 A1  7/2009  Anders et al.
2010/0241826 A1*  9/2010  Hara et al. .................. 712/29
2011/0126209 A1  5/2011  Housty

OTHER PUBLICATIONS

PCT Notification concerning Transmittal of International Preliminary Report on Patentability (Chapter I of the Patent Cooperation Treaty) for PCT Counterpart Application No. PCT/US2011/067900, 6 pgs., (Jul. 1, 2014).

Office action with summarized English translation from Taiwan Patent Application No. 101149540, mailed Apr. 30, 2015, 5 pages.

* cited by examiner

INITIALIZATION OF MULTI-CORE PROCESSING SYSTEM

CROSS-REFERENCE TO RELATED APPLICATIONS

This patent application is a U.S. National Phase Application under 35 U.S.C. §371 of International Application No. PCT/US2011/067900, filed Dec. 29, 2011, entitled INITIALIZATION OF MULTI-CORE PROCESSING SYSTEM.

TECHNICAL FIELD

This disclosure relates generally to the field of microprocessors. In particular, this disclosure relates to delivery of initialization and configuration vectors to processing cores of a multi-core processing unit.

BACKGROUND ART

Until recently, computing devices typically included a single processing unit for each socket available on the computing device's main circuit board. More recently, the single processing unit has been improved to include multiple cores, which enable the processor to execute instructions in parallel using the various cores. An ability to include additional processors or cores on a chip becomes more readily available as the footprint of the cores continues to decrease through advancements in manufacturing.

The inclusion of many cores on a chip, termed "system on a chip" or "SOC", where the SOC is accessible to the computing device through a socket, may present some new challenges to both hardware and software architects. One challenge is that the additional cores should be accessible by the socket with minimized communication paths that link the cores, thereby saving valuable space on the chip for additional cores or other necessary components. These challenges are further complicated when the availability of the cores may change during an operational life of the SOC.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to use of shared initialization and configuration vectors, which are delivered to processing cores in a multi-core processor using packets. The multi-core processor may include many cores, which may be central processing units (CPUs), graphical processing units (GPUs), general processing graphical processing units (GPGPUs), other processing logic, or a combination thereof. The various cores may be in communication with each other and/or an initialization core via an interconnect. The interconnect may be arranged as a mesh interconnect, a shared interconnect, a peer-to-peer (P2P) interconnect, or a ring interconnect.

In accordance with at least some embodiments, an initialization core may include reset logic that may read initialization and configuration vectors from a centralized storage location, which may be on a die containing the processing cores (e.g., a fuse, etc.), off the die (e.g., in volatile memory, flash memory, etc.), or a combination of both. The initialization core may then generate packets to transmit the initialization and configuration vectors to processing cores that await initialization (e.g., following a reset). In some instances, the initialization and configuration vector information may be shared by two or more cores of a same type. For example, two processing cores may share the same initialization and configuration vector, and thus not need separate copies of the initialization and configuration vector stored on the die, off the die, or both. Instead, using packets to deliver the initialization and configuration vectors, the initialization and configuration vectors may be consolidated for more efficient storage on the die, off the die, or both.

The techniques, apparatuses, and systems described herein may be implemented in a number of ways. Example implementations are provided below with reference to the following figures.

Illustrative Environment

Figure 1:
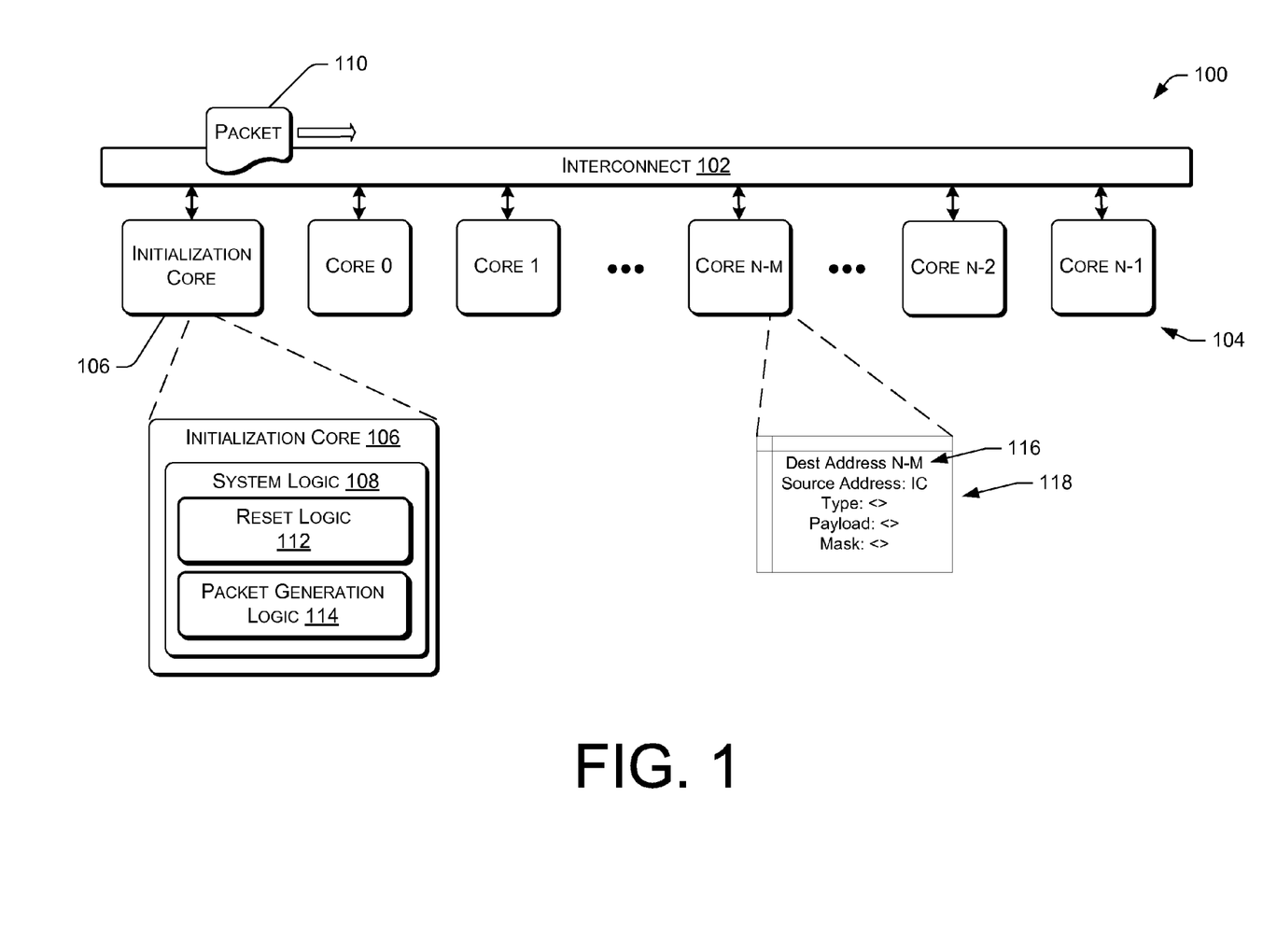
FIG. 1 is a schematic diagram of an illustrative multi-core processing unit that uses an interconnect to facilitate communication between the cores.

FIG. 1 is a schematic diagram of an illustrative multi-core processing unit 100 that uses an interconnect 102 to facilitate communication between the cores. In various embodiments, the multi-core processing unit 100 (or processor) may include a plurality of cores 104, which may be central processing units (CPUs), graphical processing units (GPUs), general processing graphical processing units (GPGPUs), other processing logic, or a combination thereof.

Figure 2:
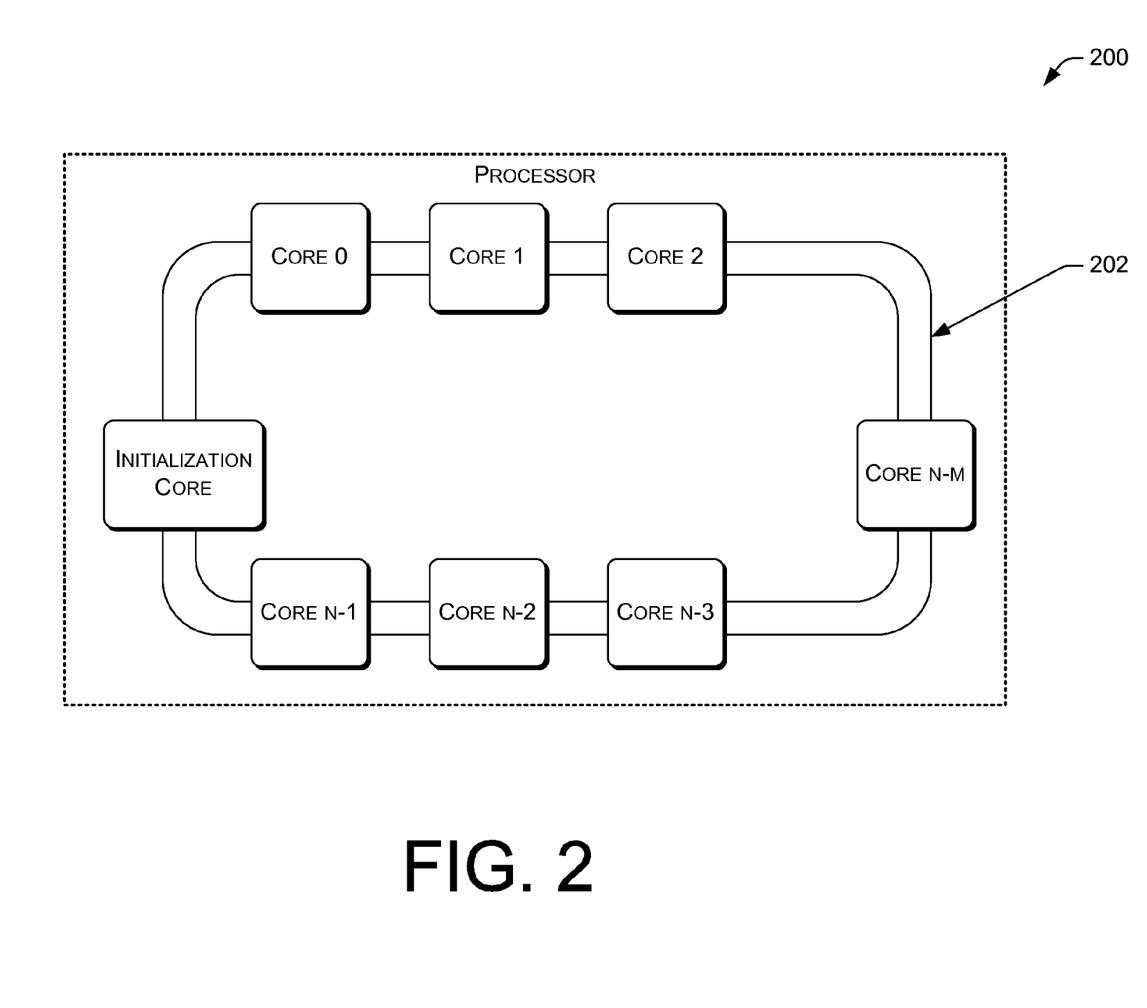
FIG. 2 is a schematic diagram of an illustrative multi-core processing unit that uses an interconnect arranged as a ring structure.
Figure 3:
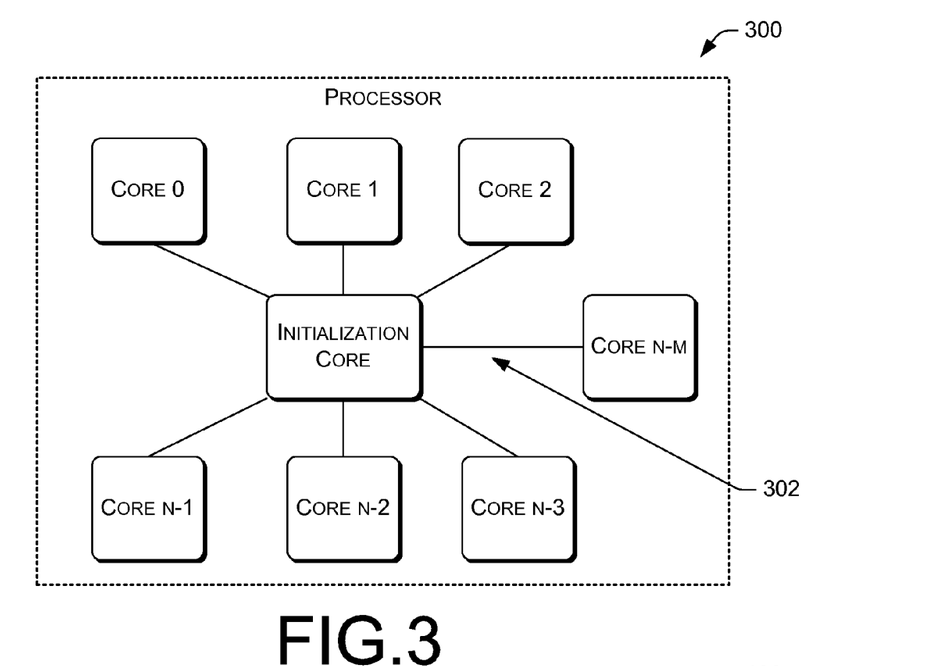
FIG. 3 is a schematic diagram of an illustrative multi-core processing unit that uses an interconnect arranged as a mesh.
Figure 4:
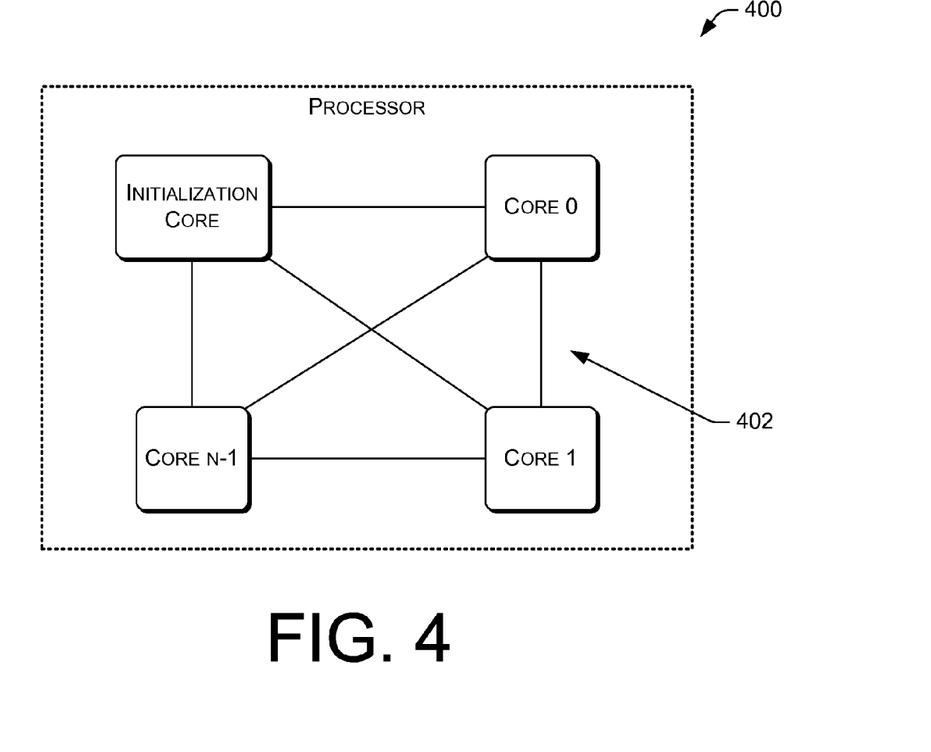
FIG. 4 is a schematic diagram of an illustrative multi-core processing unit that uses an interconnect arranged in a peer-to-peer configuration.

In accordance with the some embodiments, the various cores may be in communication with each other and/or an initialization core 106 via the interconnect 102. In accordance with various embodiments, the interconnect 102 may be arranged as a shared interconnect as shown in FIG. 1, as a ring interconnect as shown in FIG. 2, as a mesh interconnect as shown in FIG. 3, or as a peer-to-peer (P2P) interconnect as shown in FIG. 4.

The initialization core 106 may be a processor core that includes system logic 108. The system logic 108 may be used to transmit reset information and/or initialization and configuration vectors to one or more of the plurality of processing cores through use of a packet 110. The system logic 108 may include reset logic 112 and packet generation logic 114. The reset logic 112 may determine how to execute a reset (and possibly unreset of the cores). The reset logic 112 may also read the initialization and configuration vectors from storage and then instruct the packet generation logic to deliver the initialization and configuration vectors to the cores.

For example, the reset logic 112 may reset all of the cores. The reset logic may the read the initialization and configuration vectors from a centralized storage location that may be stored off the processing unit (e.g., in volatile memory, flash memory, etc), on the processing unit in a centralized and shared location, or both. The reset logic 112 may then determine which cores are to receive certain copies or versions of the initialization and configuration vectors. For example, some processing cores that are the same or substantially the same (e.g., same type such as general processing cores, shader cores, microcontroller cores, calculator cores, etc.) may use a same version of the initialization and configuration vectors as a similar or same core. By using a same version, the storage of the initialization and configuration vectors may be consolidated to copies of unique instances of the initialization and configuration vectors rather than storing a version for each core in the multi-core processor.

In accordance with various embodiments, the packet generation logic 114 may create packets that may include reset packets and initialization and configuration vector (ICV) packets. The packets may communicate instructions, commands, and/or information to the various cores of the multi-core processing unit. For example, the packet generation logic 114 may create a packet for each of the cores to communicate to the cores to perform a reset and power-off the cores. The packet generation logic 114 may then create a second set of packets (one for each core, one for multiple cores, etc.), that includes the initialization and configuration vectors as ICV packets.

The packet 110 may include an address of a recipient core, such as the core N–M or another core. In some embodiments, the packet may include multiple addresses of different cores, where the cores may have different information to be transmitted to the respective cores or the cores may have the same information to be transmitted to the respective cores. When the packet 110 is received by a core having a destination address 116 specified by the packet, the core may read at least a portion of the contents 118 of the packet that applies to the core. In some embodiments, a core may read a command (e.g., from a "type", "payload" or other part of the packet) from the packet. The core may then implement the command, such as by resetting (powering-off), unresetting (powering-on), or performing other tasks or functionality as described herein.

FIG. 2 is a schematic diagram of an illustrative multi-core processing unit 200 that uses an interconnect arranged as a ring structure 202. The ring structure 202 may accommodate an exchange of the packet 110 between the initialization core and the other cores or between any combinations of the cores.

FIG. 3 is a schematic diagram of an illustrative multi-core processing unit 300 that uses an interconnect arranged as a mesh 302. The mesh 302 may accommodate an exchange of the packet 110 between the initialization core and the other cores or between any combinations of the cores.

FIG. 4 is a schematic diagram of an illustrative multi-core processing unit 400 that uses an interconnect arranged in a peer-to-peer configuration 402. The peer-to-peer configuration 402 may accommodate an exchange of the packet 110 between the initialization core and the other cores or between any combinations of the cores.

Illustrative Global Reset

Figure 5:
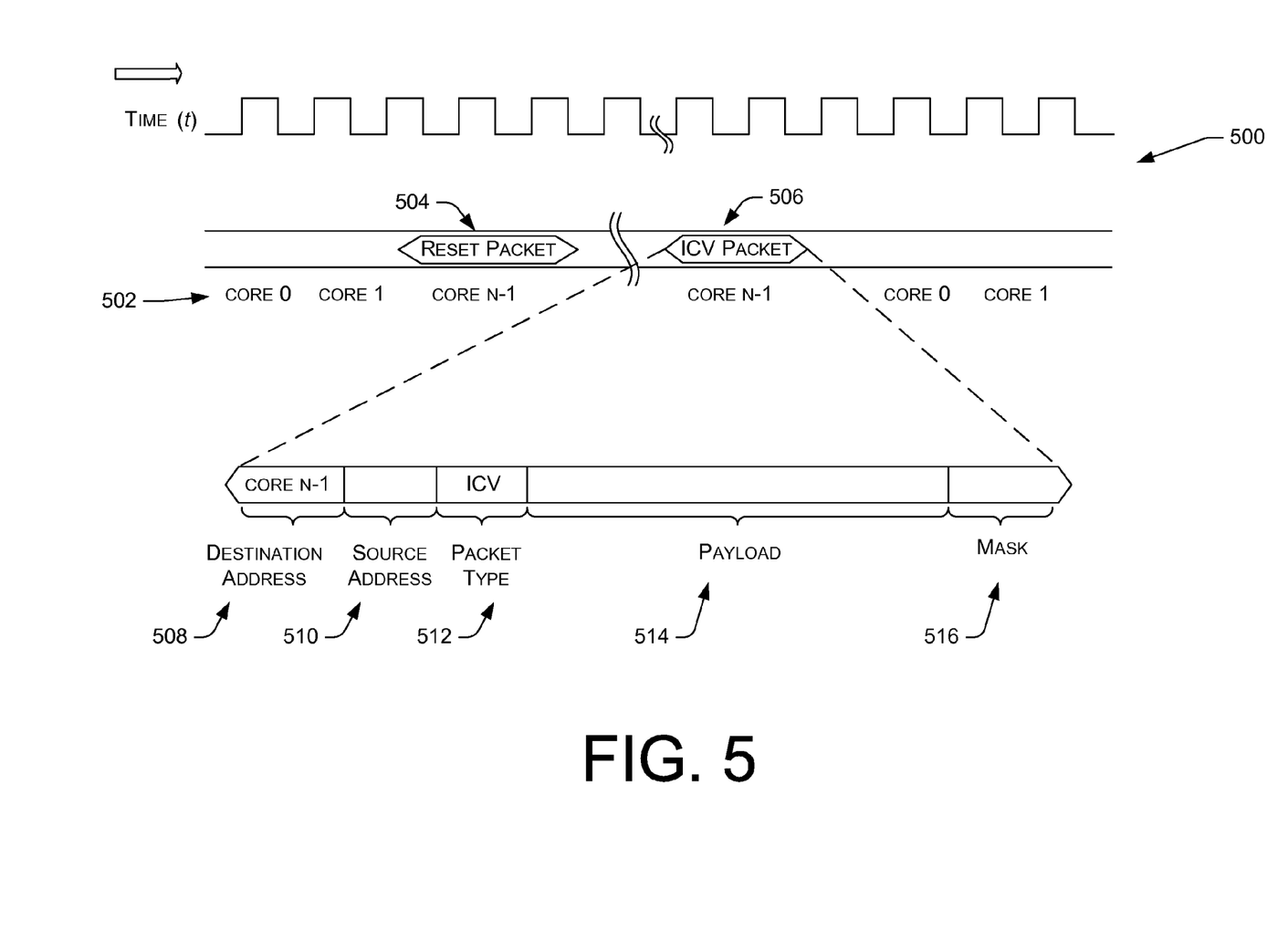
FIG. 5 is a schematic diagram showing illustrative packets that are transmitted to various processing cores to deliver initialization and configuration vectors.

FIG. 5 is a schematic diagram showing illustrative packets 500 that are transmitted to various cores to deliver initialization and configuration vectors and other possible information. The packets may be transmitted over time (t) to various cores (e.g., core 0, core 1, core n–1, etc.) in the multi-core processor. The packets 500 may be generated by the packet generation logic 114 and transmitted to the various cores 502 in response to instructions from the reset logic 112. The reset logic 112 may issue a request to the packet generation logic 114 to transmit a reset packet 504 to one or more of the cores 502 at a particular time t. For example, the reset packet 504 may be issued to a core n–1. Other cores, such as core 0 and core 1 may also receive reset packets or other types of packets. At a later time (t), the reset logic 112 may instruct the packet generation logic 114 to transmit initialization and configuration vector information to the core n–1. The reset logic 112 may first read the initialization and configuration vectors from storage. The packet generation logic may then generate an ICV packet 506 for the core n–1 having the initialization and configuration vector information for the respective core.

An illustrative ICV packet 506 shows example information that may be included in the packet. The packet may include a destination address 508 that indicates a core that the packet is to be delivered to, such as core n–1, etc. A source address 510 may indicate an address of a sender of the packet. A packet type 512 may indicate an operation for the core or provide general information to the core. For example, the packet type 512 may be "ICV", "reset," "unreset," or another packet type. When the packet type 512 is reset, the core having the destination address may perform the reset. When the packet type is ICV, the core may perform initialization and configuration operations using information contained in the packet. The packet may also include a payload 514 and mask 516. The payload 514 may include additional information or instructions for the core having the destination address. For example, the payload may include the initialization and configuration vector information for the core.

Figure 6:
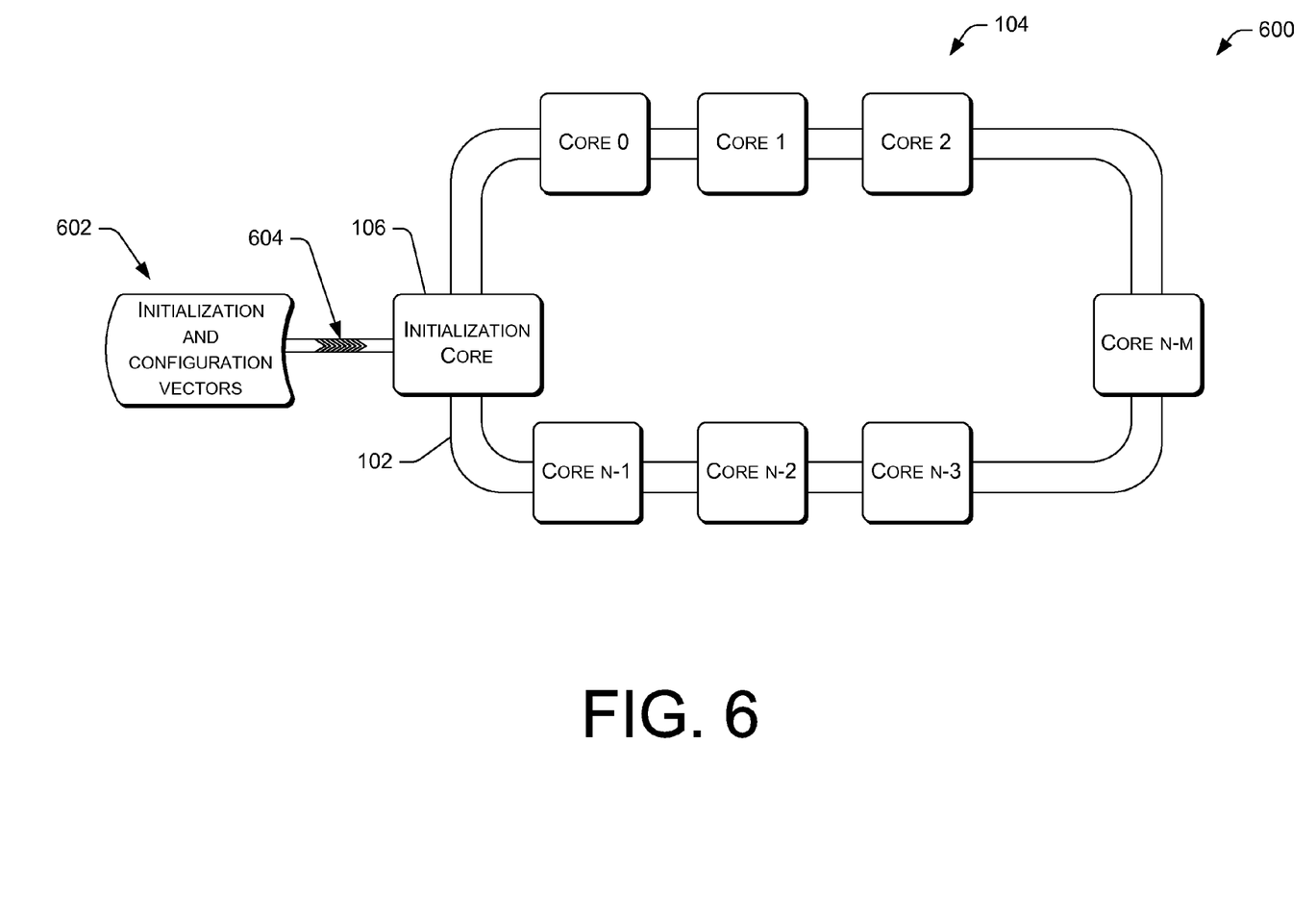
FIG. 6 is a schematic diagram of a multi-core processing unit where an initialization core reads initialization and configuration vectors.

FIG. 6 is a schematic diagram of a multi-core processing unit 600 where an initialization core reads initialization and configuration vectors. The initialization core 106 may read the initialization and configuration vectors from storage 602. The storage 602 may be on a die that includes the initialization core, off the die, or a combination of both. For example, the storage 602 may be flash memory, volatile memory, or other memory located off the die. The storage 602 may also be on the die as a fuse or other types of storage on the die. Unlike conventional storage of the initialization and configuration vectors, the storage 602 may not dedicated to a single core, but instead may be connected via the interconnect 102 to multiple cores. Further, the storage 602 may store unique instances of the initialization and configuration vectors, which may reduce duplication, whereas conventional storage stores one copy for each core. Thus, the storage 602 dedicated to storing the initialization and configuration vectors may be consolidated.

In accordance with various embodiments, the initialization core 106, via the reset logic 112, may read the initialization and configuration vectors from the storage 602 during a reading processing 604. The initialization core 106 may read all of the initialization and configuration vectors at one time or a portion of the initialization and configuration vectors at a time. For example, when resetting a single core, the initialization core 106 may only read the initialization and configuration vectors for the core to be initialized.

Figure 7:
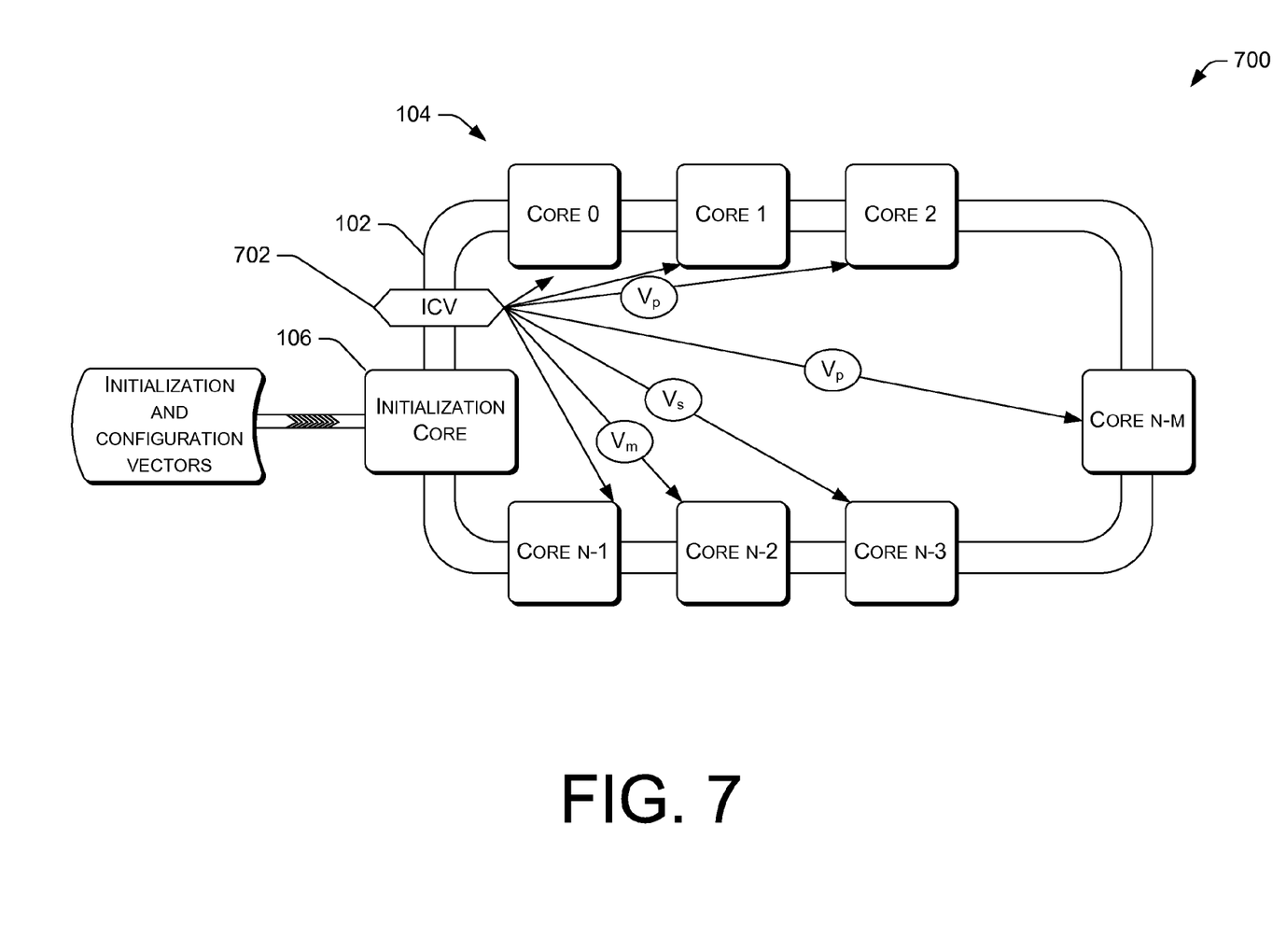
FIG. 7 is a schematic diagram of a multi-core processing unit where the initialization core delivers initialization and configuration vectors to processing cores of a multi-core processing unit.

FIG. 7 is a schematic diagram of a multi-core processing unit 700 where the initialization core delivers initialization and configuration vectors to processing cores of a multi-core processing unit. The initialization core 106 may generate one or more ICV packet 702 to transmit the initialization and configuration vectors to one or more of the cores 104. For example, the reset logic 112 may determine which initialization and configuration vectors are to be delivered to a particular core. The reset logic 112 may then instruct the packet generation logic 114 to transmit the ICV packet 702 to the particular core. In some instances, the same initialization and configuration vectors delivered to one core may be used by another core, such as a core of the same type. As shown in FIG. 7, some cores may receive a same or similar instance of the initialization and configuration vectors, such as core 2 and core n−m, which may be of a same type of core. Other cores, which are not of a same type as core 2 or core n−m, may receive different initialization and configuration vectors. Cores of a same or similar type (e.g., core 2 and core n−m) may receive separate packets or may receive a same packet that is shared by the cores.

Illustrative Operation

Figure 8:
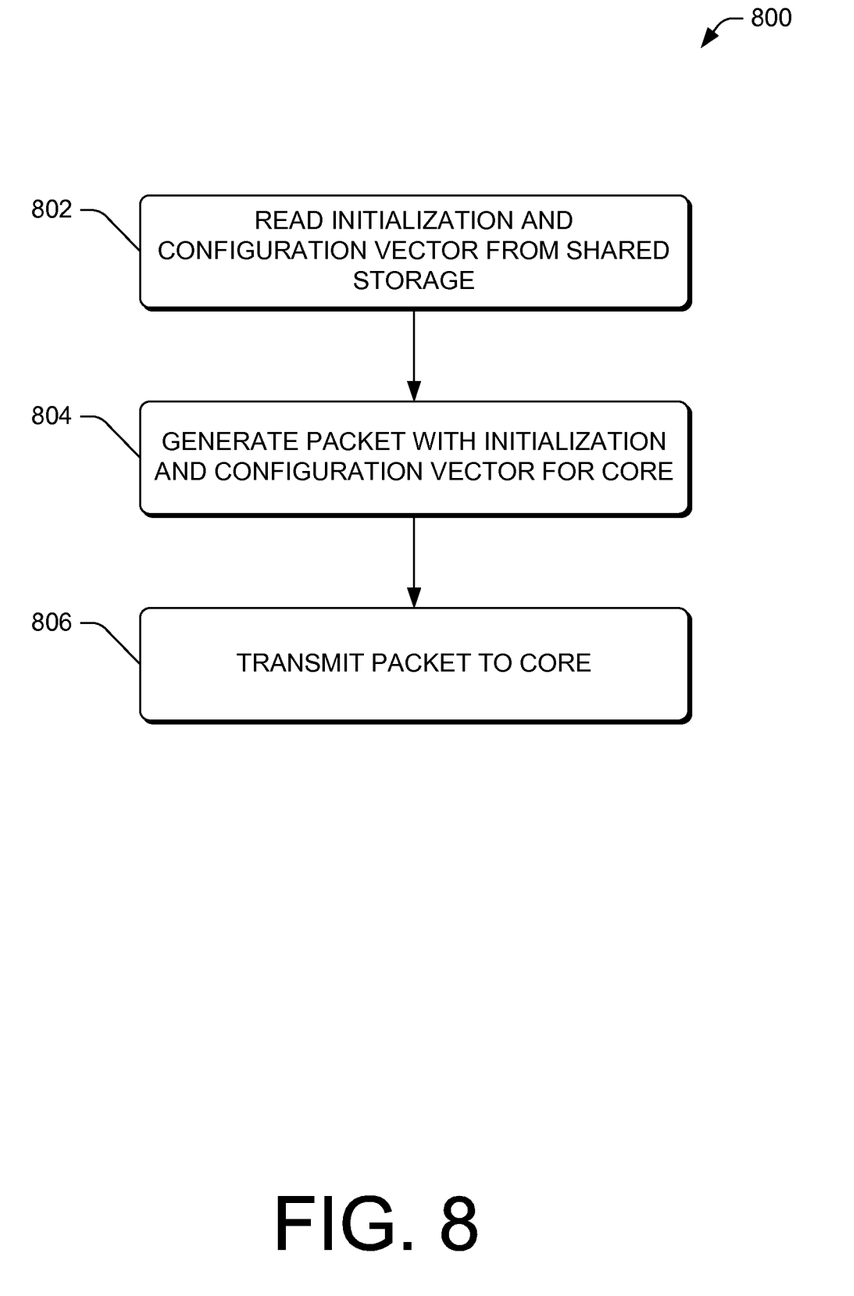
FIG. 8 is a flow diagram of an illustrative process to provide initialization and configuration vectors to processing cores of a multi-core processing unit.
Figure 9:
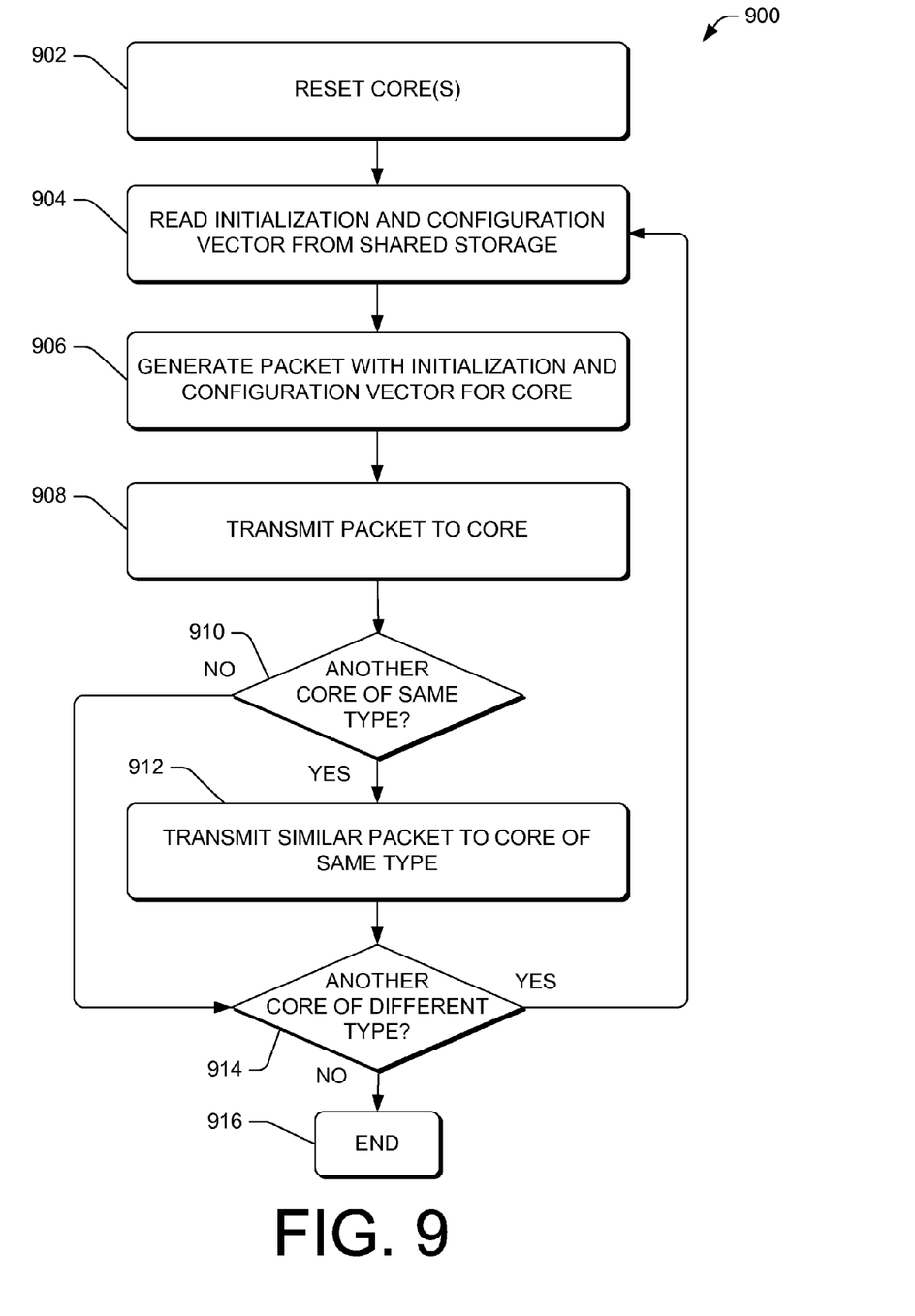
FIG. 9 is a flow diagram of another illustrative process to provide initialization and configuration vectors to processing cores of a multi-core processing unit.

FIGS. 8 and 9 show illustrative processes to read and deliver initialization and configuration vectors to cores of a multi-core processor. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to the previously described environments. Of course, the processes may be performed in other similar and/or different environments.

FIG. 8 is a flow diagram of an illustrative process 800 to provide initialization and configuration vectors to processing cores of a multi-core processing unit.

At 802, the system logic 108 may read initialization and configuration vectors from the storage 602. For example, the reset logic 112 may determine a type of core to be initialized. The reset logic 112 may determine a type of core based on an identifier of the core, address of the core, or other information about the core. The reset logic 112 may then determine which initialization and configuration vector(s) to obtain for the respective core. In some embodiments, the operation 602 may read vectors for the respective core and not read other vectors.

At 804, the packet generation logic 114 may generate the ICV packet 702 that contains the initialization and configuration vector(s). The reset packet 112 may instruct the packet generation logic 114 to generate the ICV packet with the appropriate initialization and configuration vector(s) for the respective core that awaits initialization.

At 806, the packet generation logic 114 may transmit the ICV packet 702 to the respective core. In some instances, the packet may be used by another core that is similar or the same as the respective core and is also awaiting initialization.

FIG. 9 is a flow diagram of another illustrative process 900 to provide initialization and configuration vectors to processing cores of a multi-core processing unit.

At 902, the reset logic 112 may cause one or more cores to reset. For example, the reset logic 112 may instruct the packet generation logic 114 to transmit reset packets to the one or more cores.

At 904, the reset logic 108 may read initialization and configuration vectors from the storage 602. As discussed above, the reset logic 112 may determine a type of core to be initialized. The reset logic 112 may determine the type of core based on an identifier of the core, address of the core, or other information about the core. The reset logic 112 may then determine which initialization and configuration vector(s) to obtain for the respective core(s).

At 906, the packet generation logic 114 may generate the ICV packet 702 that contains the initialization and configuration vector(s). The reset packet 112 may instruct the packet generation logic 114 to generate the ICV packet 702 with the appropriate initialization and configuration vector(s) for the respective core that awaits initialization.

At 908, the packet generation logic 114 may transmit the ICV packet 702 to the respective core.

At 910, the reset logic 112 may detect whether another core of a same or similar type awaits an initialization. For example, core may be a same type or similar type when the core performs the same or similar functionality of the respective core (e.g., a general processing core, a shader core, a microcontroller core, a calculator core, etc.) When another core of a same or similar type awaits initialization (following the "yes" route from the decision operation 910), then the process 900 may continue at an operation 912.

At 912, the packet generation logic 114 may transmit a similar ICV packet 702 to the respective core. The packet may include the same or similar initialization and configuration vector(s) as those transmitted to the respective core at the operation 908. However, some portions of the initialization and configuration vector(s) may be modified based on characteristics of the particular destination core.

Following the operation 912, or when no other core of a same or similar type awaits initialization (following the "no" route from the decision operation 910), then the process 900 may proceed to an operation 914. At 914, the reset logic 112 may detect whether another core of a different type awaits initialization. When another core of a different type awaits initialization (following the "yes" route from the decision operation 914), then the process 900 may continue at the operation 904 by reading the initialization and configuration vectors from the storage 602. When no other core of a different type awaits initialization (following the "no" route from the decision operation 914), the process 900 may end at 916.

Illustrative System

Figure 10:
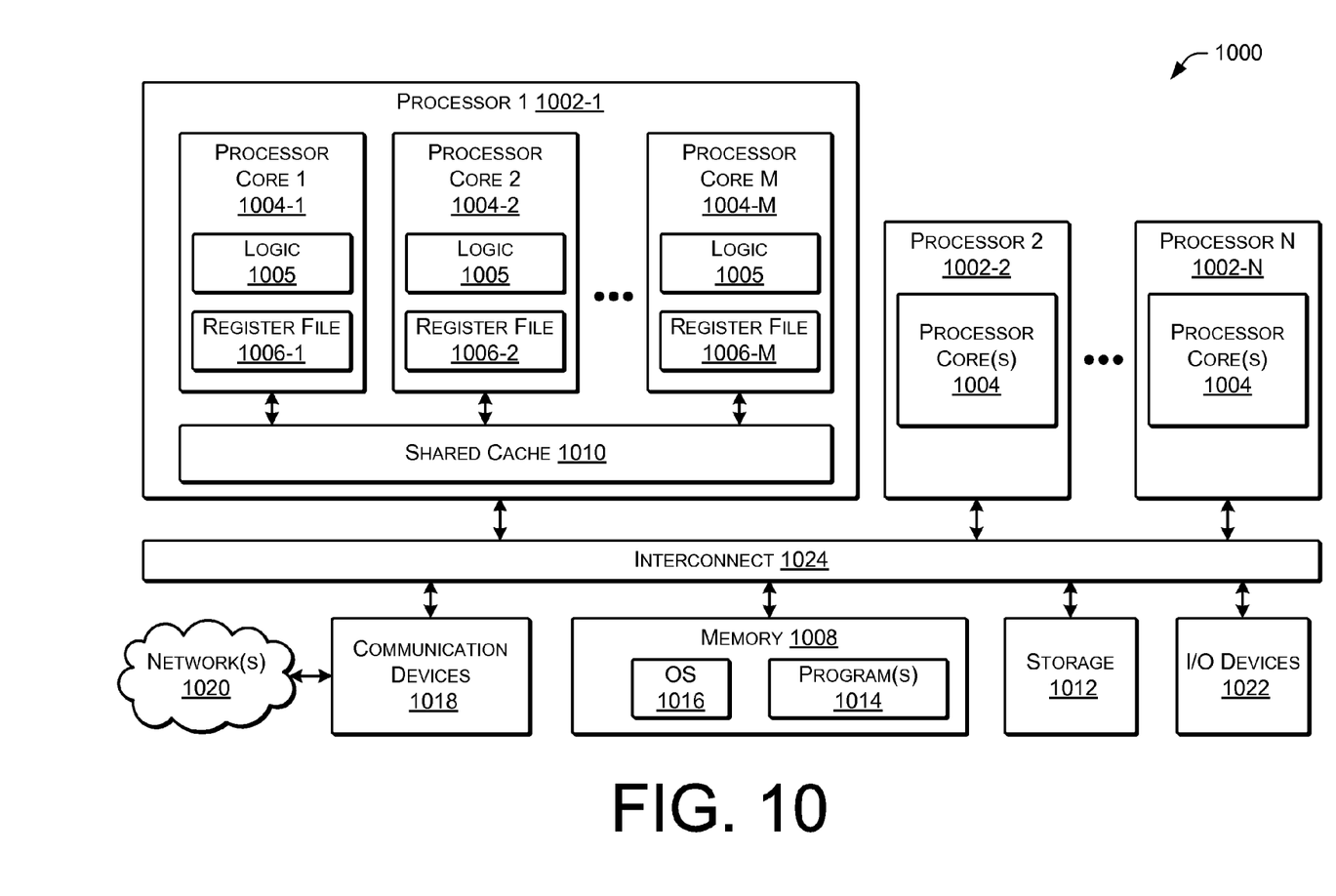
FIG. 10 is a block diagram of an illustrative system using shared initialization and configuration vectors.

FIG. 10 illustrates nonlimiting select components of an illustrative system 900 according to some implementations herein that may include one or more instances of the processor architecture discussed above for implementing shared initialization and configuration vectors. The system 1000 may include one or more processors 1002-1, 1002-2, ..., 1002-N (where N is a positive integer≥1), each of which may include one or more processor cores 1004-1, 1004-2, ..., 1004-M (where M is a positive integer≥1). In some implementations, as discussed above, the processor(s) 1002 may be a single core processor, while in other implementations, the processor(s) 1002 may have a large number of processor cores, each of which may include some or all of the components illustrated in FIG. 10. For example, each processor core 1004-1, 1004-2, ..., 1004-M may include an instance of logic 1005 to perform various tasks for that respective processor core 1004-1, 1004-2, ..., 1004-M. The logic 1005 may include one or more of dedicated circuits, logic units, microcode, or the like.

The processor(s) 1002 and processor core(s) 1004 can be operated to fetch and execute computer-readable instructions stored in a memory 1008 or other computer-readable media. The memory 1008 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 1004, in some implementations, the multiple processor cores 1004 may share a shared cache 1010. Additionally, storage 1012 may be provided for storing data, code, programs, logs, and the like. The storage 1012 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 1000, the memory 1008 and/or the storage 1012 may be a type of computer readable storage media and may be a non-transitory media.

The memory 1008 may store functional components that are executable by the processor(s) 1002. In some implementations, these functional components comprise instructions or programs 1014 that are executable by the processor(s) 1002. The example functional components illustrated in FIG. 10 further include an operating system (OS) 1016 to mange operation of the system 1000.

The system 1000 may include one or more communication devices 1018 that may include one or more interfaces and hardware components for enabling communication with various other devices over a communication link, such as one or more networks 1020. For example, communication devices 1018 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 1000 may further be equipped with various input/output (I/O) devices 1022. Such I/O devices 1022 may include a display, various user interface controls (e.g., buttons, joystick, keyboard, touch screen, etc.), audio speakers, connection ports and so forth. An interconnect 1024, which may include a system bus, point-to-point interfaces, a chipset, or other suitable connections and components, may be provided to enable communication between the processors 1002, the memory 1008, the storage 1012, the communication devices 1018, and the I/O devices 1022.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor comprising:
   a plurality of processing cores;
   an interconnect coupled to the plurality of processing cores; and
   a first logic to transmit an initialization information to at least one of the plurality of processing cores on the interconnect, wherein the initialization information is to be formatted into a packet to include a packet type to indicate an operation for the at least one processing core and a payload with initialization and configuration vector information for the at least one processing core.

2. The processor as recited in claim 1, wherein the first logic reads the initialization information from storage that is at least partially separate from the processor.

3. The processor as recited in claim 2, wherein the storage is a centralized and shared storage that includes unique instances of the initialization information that is be used by one or more of the plurality of processing cores.

4. The processor as recited in claim 3, further comprising a second logic to reset the plurality of processing cores on the interconnect prior to transmission of the initialization information.

5. The processor as recited in claim 1, wherein the first logic transmits a same instance of the initialization information to at least two of the plurality of processing cores.

6. The processor as recited in claim 1, wherein the interconnect is arranged as a ring structure.

7. A system comprising:
   a plurality of processing cores;
   an interconnect coupled to the plurality of processing cores; and
   a system logic to transmit initialization information over the interconnect to the plurality of processing cores, wherein the initialization information is to be formatted into a packet, the packet to contain an address of a destination processing core to be initialized, a packet type to indicate an operation, and the initialization information to initialize the destination processing core, wherein the initialization information is initialization and configuration vectors.

8. The system as recited in claim 7, wherein the system logic reads the initialization information from storage that is located at least partially separate from the plurality of processing cores.

9. The system as recited in claim 8, wherein the storage is a centralized storage that includes unique instances of the initialization information that is be used by one or more of the plurality of processing cores.

10. The system as recited in claim 7, wherein the plurality of processing cores are reset prior to transmission of the initialization information over the interconnect to the plurality of processing cores.

11. The system as recited in claim 10, wherein the system logic transmits a same instance of the initialization information to at least two of the plurality of processing cores.

12. The system as recited in claim 7, wherein the interconnect is arranged as a ring structure to facilitate the transmitting of the packet.

13. A method comprising:
   forming a packet to contain a packet type to indicate an operation and initialization information in the form of initialization and configuration vectors;
   routing the packet over an interconnect to a particular processing core from among a plurality of processing cores; and
   initializing the particular processing core with the initialization information.

14. The method as recited in claim 13, further comprising reading the initialization information from storage that is located at least partially separate from the processor.

15. The method as recited in claim 14, wherein the storage is a centralized storage that includes unique instances of the initialization information that is used by one or more of the plurality of processing cores.

16. The method as recited in claim 13, further comprising resetting the particular processing core prior to the initializing the particular processing core with the initialization information.

17. The method as recited in claim 13, wherein the initialization information is shared for at least two processing cores of the plurality of processing cores.

18. The method as recited in claim 13, wherein the packet is transmitted from an initialization core to particular core via the interconnect.

* * * * *